United States Patent
Takizawa et al.

(10) Patent No.: US 6,720,952 B1
(45) Date of Patent: *Apr. 13, 2004

(54) INPUT DEVICE FOR INJECTION MOLDING MACHINE

(75) Inventors: Michiaki Takizawa, Nagano (JP); Kazuo Usui, Nagano (JP); Takashi Hakoda, Nagano (JP); Chiharu Nishizawa, Nagano (JP)

(73) Assignee: Nissei Plastic Industrial Co., Ltd., Nagano-Ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1044 days.

(21) Appl. No.: 08/947,470

(22) Filed: Oct. 9, 1997

(30) Foreign Application Priority Data

Oct. 9, 1996  (JP) .............................................. 8-268606

(51) Int. Cl.$^7$ .................................................. G09G 5/00
(52) U.S. Cl. ........................................ 345/173; 345/168
(58) Field of Search ................................ 345/173, 174, 345/178, 168

(56) References Cited

U.S. PATENT DOCUMENTS

| | | | | | |
|---|---|---|---|---|---|
| 4,745,241 A | * | 5/1988 | Furukawa et al. | ........ | 178/18.01 |
| 5,177,328 A | * | 1/1993 | Ito et al. | ......................... | 178/18 |
| 5,300,943 A | * | 4/1994 | Jakobs et al. | ................ | 345/173 |
| 5,594,471 A | * | 1/1997 | Deeran et al. | ............... | 345/173 |
| 5,631,805 A | * | 5/1997 | Bonsall | ....................... | 361/681 |

FOREIGN PATENT DOCUMENTS

JP          A-2103114          4/1990

* cited by examiner

*Primary Examiner*—Regina Liang
(74) *Attorney, Agent, or Firm*—Birch, Stewart, Kolasch & Birch, LLP

(57) ABSTRACT

An input device for an injection molding machine is constructed with an input touch panel fitted over a display screen. The input touch panel is formed greater than the display screen. A panel extension portion of the input touch panel is located outside of the display screen. At least one key portion having at least one specific key is displayed on the panel extension portion. By this arrangement, no separate switch panel, such as a membrane sheet switch, is necessary and all inputs can be made by touch operation.

7 Claims, 4 Drawing Sheets

INPUT DEVICE FOR INJECTION MOLDING MACHINE

BACKGROUND OF THE INVENTION

1. Field of the Invention

The present invention relates to an input device for an injection molding machine having an input touch panel fitted over a screen of a display device.

2. Description of the Related Art

Conventionally, as an input device for an injection molding machine, there has been known a touch type input device for an injection molding machine as disclosed in Japanese Unexamined Patent Publication (Kokai) No. Heisei 2(1990)-103114. With such touch type input device, all input operation can be performed through an input touch panel fitted over a screen of a display device.

On the other hand, as another example of the conventional input device, in which the touch type input device is applied, there has been known an input device 50, in which the touch type input device is combined with an independently provided switch panel as illustrated in FIGS. 5 and 6.

The shown input device 50 includes a first input device 50a and a second input device 50b. The first input device 50a includes an input touch panel 52 fitted over a screen 51v of a display device. The first input device 50a is designed such that various key pattern portions 53a, 53b, 53c, . . . displayed on the screen 51v as shown in FIG. 6 may be selected for touching by a finger, and then, the XY coordinates of the touched position on the input touch panel 52 are detected by a not shown controller.

In the case of the injection molding machine, there are a wide variety of items to be set, such as pressure, speed, position, temperature and so forth. A ten key portion 54, commonly used for setting various molding conditions and so forth, a function key portion 55, including a screen selector key and so forth; and a cursor key portion 56; are provided in another independent switch panel 57 formed with a membrane sheet switch or so forth. This switch panel 57, is arranged at an adjacent position to the screen 51V to constitute the second input device 50b.

However, in such input device 50, since the second input device 50b formed with the switch panel 57 in addition to the first input device 50a, cost is inherently risen for necessity of use of the switch panel 57 of membrane sheet switch or so forth. Furthermore, since the number and layout of the key switches in the switch panel 57 is fixed, addition and deletion of the key and/or modification of the key switch layout is not possible to cause a problem in poor general applicability and evolvability. In addition, while the input touch panel 52 of the first input device 50a requires only soft toughing for input, the switch panel 57 of the second switch device 50b requires depression with relatively large force to cause different touching feeling in operation to degrade operation feeling.

SUMMARY OF THE INVENTION

It is therefore an object of the present invention to provide an input device for an injection molding machine which can make the separate switch panel, such as membrane sheet switch or the like unnecessary to realize significant reduction of cost.

Another object of the present invention is to provide an input device for an injection molding machine which can provide uniform key touching feeling over all keys in operation and thus improve operation feeling in use.

In order to accomplish the foregoing object, an input device for an injection molding machine, according to the present invention, having an input touch panel fitted over a display screen, comprises a panel extension portion extended from the input touch panel and located out of the display screen, and at least one key portion having at least specific key, the at least one key portion being displayed on the panel extension portion.

By this, in the panel extension portion to be a part of the input touch panel, a ten-key portion, a function key portion and a cursor key portion are provided. Therefore, it becomes unnecessary to provide a separate switch panel, such as a membrane sheet switch or the like. Also, since the ten-key portion, the function key portion and cursor key portion can be displayed by printing or so forth, addition, deletion of keys and modification of layout can be facilitated.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

Figure 1:
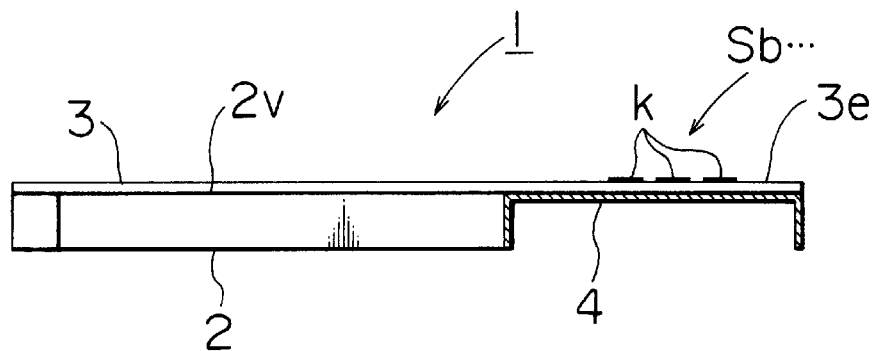
FIG. 1 is a diagrammatic side elevation of the preferred embodiment of an input device according to the present invention.

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instances, well-known structures are not shown in detail in order to avoid unnessarily obscuring the present invention.

At first, a construction of the preferred embodiment of an input device 1 according to the present invention, will be discussed with reference to FIGS. 1 to 4.

In the drawings, the reference numeral 2 denotes a display employing a liquid crystal display. On a screen 2v of the display 2, input touch panel 3 is fitted over. In this case, the input touch panel 3 is formed greater than the screen 2v to provide a panel extension portion 3e extended outside of the screen 2v. The input touch panel 3 may be any type of touch panel, such as an electrostatic capacitive type, optical type, resistance sheet type or so forth. As one example, the electrostatic capacitive type input touch panel has a multi-layered structure consisting of a transparent substrate layer, a transparent resistor film layer and a transparent insulation layer, and is designed to output XY coordinate information of a touched position by touching the surface thereof with a hand.

On the surface of the panel extension portion 3e, ten-key portion Sa, having one or more specific keys k . . . , a function key portion Sb, including a screen selector key, and a cursor key portion Sc, are printed. Also, adjacent the display 2, a support plate 4 is arranged for supporting the panel extension portion 3e in flush with the screen 2v of the display 2. In this case, it is not essential to provide the support plate 4 as a separate component, but an existing panel for housing may be used as the support plate.

Figure 4:
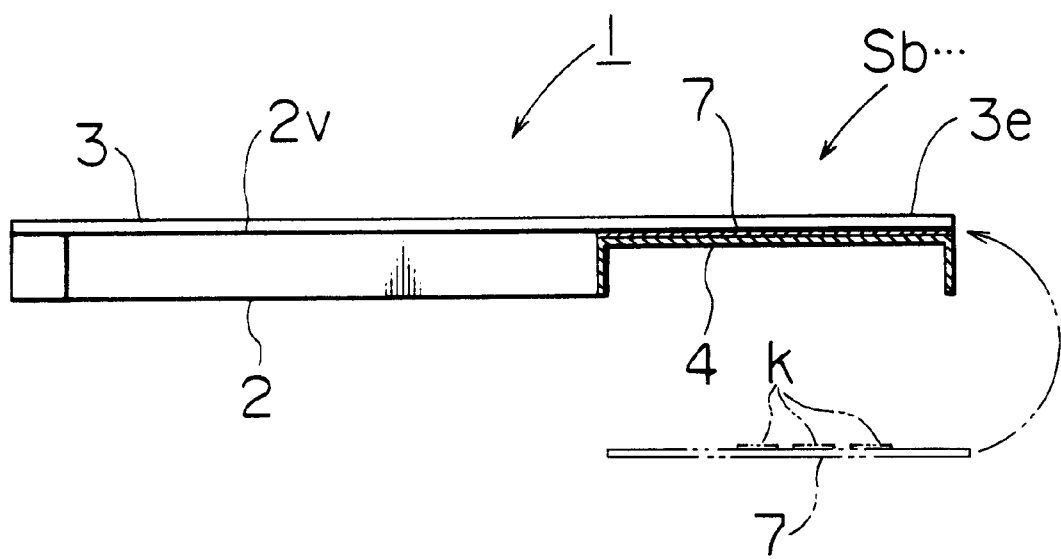
FIG. 4 is a diagrammatic side elevation of another form of a key portion in the preferred embodiment of the input device.
Figure 5:
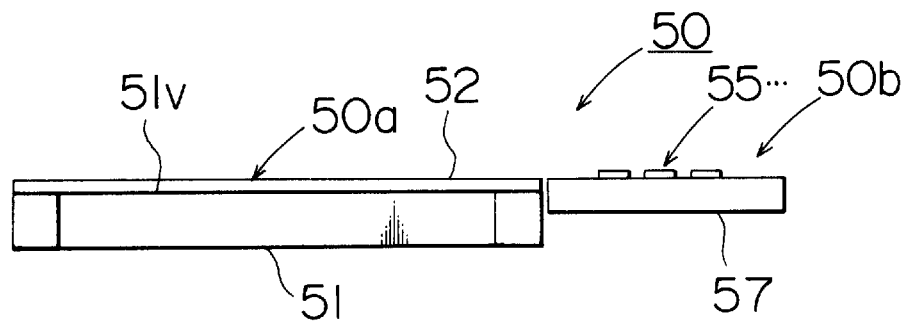
FIG. 5 is a diagrammatic side elevation of the conventional input device.
Figure 6:
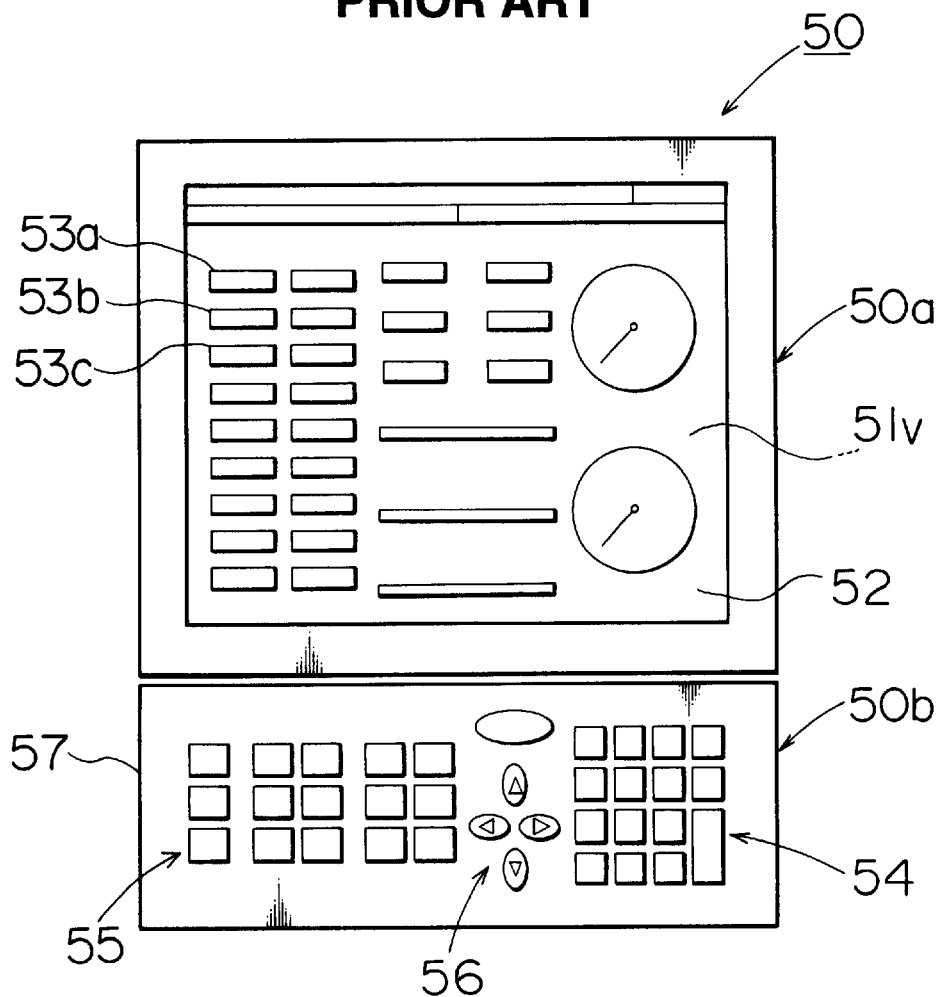
FIG. 6 is a front elevation of the conventional input device of FIG. 5.

It should be appreciated that while the shown embodiment has the Key portions Sa, Sb, Sc printed in the panel extension portion 3e to make the accessible positions for key operation visually perceptible, it is also possible to print these key portions on the support plate so that the printed keys on the support plate may be visible through the transparent panel extension portion 3e. Also, it is possible to fit or adhere a printed matter, on which the key portions are printed, on the surface of the panel extension portion 3e. In the further alternative, a printed sheet 7, on which the keys are printed at respective positions, may be interposed between the panel extension portion 3e and the support plate 4, as shown in FIG. 4. Furthermore, it is also possible to employ the foregoing manners of indication of the accessible positions in combination. In any case, it is facilitated to add or delete the keys and to modify key layout.

The input touch panel 3 is connected to a controller 10 which has a coordinate detecting function portion 11 and a controller main body 12. The controller main body 12 has a computer function. The display 2 is connected to the controller main body 12. It should be noted that the input device 1 constructed as set forth above is arranged on a side surface panel Mp of an injection molding machine M.

Figure 2:
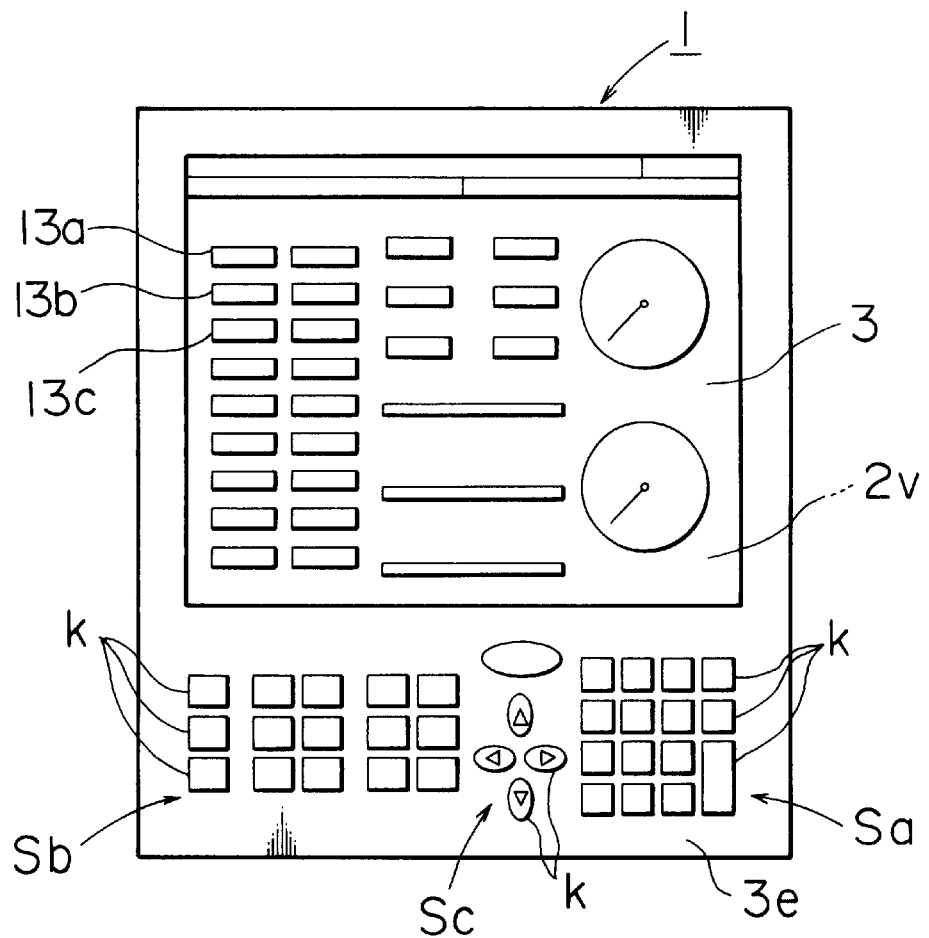
FIG. 2 is a front elevation of the preferred embodiment of the input device.
Figure 3:
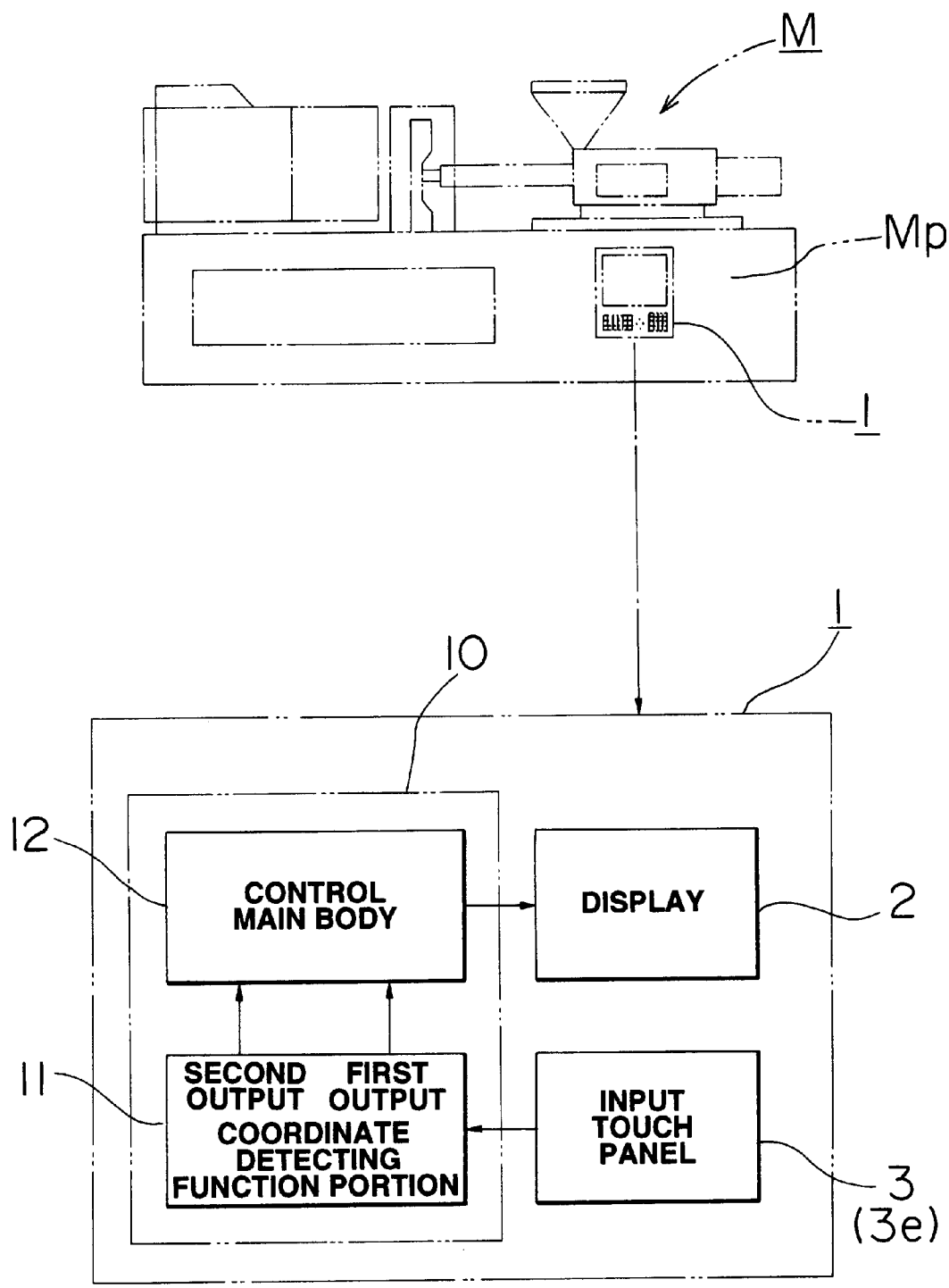
FIG. 3 is a block diagram showing a processing system including the preferred embodiment of the input device.

Next, a function of the preferred embodiment of the input device 1 will be discussed with reference to FIGS. 2 and 3.

At first, on the screen 2v, various key pattern portions 13a, 13b, 13c, . . . are displayed. Thus, by selecting desired key pattern portions 13a, . . . , setting of molding conditions of the injection molding machine or so forth can be performed. For instance, selecting "injection speed key" and touching a position of the input touch panel corresponding to the selected key by a finger, the XY coordinate of the touched position on the input touch panel 2 is detected by the coordinate detecting function portion 11 in the controller 10. At this time, the detected XY coordinate identifies the position other than the area of the panel extension portion 3e. Therefore, the coordinate detecting function portion 11 makes a judgment that the incoming XY coordinate information is input information corresponding to the key pattern portion 13a, 13b, 13c, . . . displayed on the display screen 2v to supply a first output to the controller main body 12. Accordingly, the first output is used as an input of the input touch panel corresponding to the screen 2v, as is well known in the art.

According to the present invention, input can be performed in a similar manner through ten-key portion Sa, the function key portion Sb and the cursor key portion Sc displayed on the panel extension portion 3e. For instance, after selection of "injection speed key", a numerical value corresponding to a set value is selected by keys k . . . in the ten-key portion Sa. Positions within of the panel extension portion 3e corresponding to the selected numerical value by the finger, the XY coordinate in the panel extension portion 3e, is detected by the coordinate detecting function portion 11. At this time, the detected XY coordinate identifies the XY coordinate position within the area of the panel extension portion 3e. Therefore, the coordinate detecting function portion 11 makes a judgment that the incoming XY coordinate represents input information entered from the ten-key portion Sa, the function key portion Sb or the cursor key portion Sc to supply a second output to the controller main body 12.

As set forth above, in the shown embodiment of the input device, since all input can be performed through the input touch panel 3, a separate switch panel, such as a membrane sheet switch or the like becomes unnecessary to contribute to a lowering of the cost. Also, since feeling in touching of the key in operation is uniform over all keys, operation feeling in use can be remarkably improved.

It should be noted that a method for performing all input through the input touch panel 3 has been disclosed in Japanese Unexamined Patent Publication No. Heisei 2 (1990) 103114. As in the input device of the above-identified publication, in which the ten-key portion Sa, the function key portion Sb and the cursor key portion Sc may be displayed on the screen 2v of the display 2, However, in such case, the display 2 has to be greater for displaying increased number of key patterns to make the display bulky. This results in difficulty for satisfying a demand for low cost. Furthermore, it becomes difficult to discriminate the ten-key portions Sa, the function key portion Sb and the cursor key portion Sc from other key patterns 13a, . . . displayed on the screen 2v to cause lowering of operability and to be a cause of erroneous operation.

Also, since the ten-key portion Sa, the function key portion Sb and the cursor key portion Sc can be displayed by printing or the like addition and deletion of the keys k . . . and modification of the key layout can be facilitated.

Although the present invention has been illustrated and described with respect to an exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed, and equivalents thereof, with respect to the features set out in the appended claims.

For example, while the shown embodiment has been discussed in terms of the preferred embodiment, in which the display 2 is constructed with the liquid crystal display, any appropriate display device, such as a CRT display, plasma display and the like, can be employed. Also, the key portions to be displayed on the surface of the panel extension portion 3e are specified to those illustrated in the shown embodiment. That is, the key portions to be displayed in the panel extension portion 3e can be one or two of the ten-key portion Sa, the function key portion Sb and the cursor key portion Sc. In the alternative, any additional key portion may be provided in the panel extension portion 3e.

What is claimed is:

1. An apparatus comprising:

a molding machine; and an input device for inputting data into said molding machine, said input device including:

an electronic display screen defined within a first area;

a support plate arranged adjacent to said electronic display screen;

indicia, indicating functions of a plurality of input keys, printed on said support plate; and a touch input panel having a sensing region responsive to a touch of a human finger, said sensing region being defined within a second area, said second area overlaying said first area and being larger than said first area, and a portion of said second area which does not overlay said first area being defined as a panel extension portion and overlaying said indicia printed on said support plate.

2. The apparatus according to claim 1, wherein said molding machine is an injection molding machine.

3. The apparatus according to claim 2, wherein said first area of said display screen includes input keys for operating parameters of said injection molding machine.

4. The apparatus according to claim 1, wherein said plurality of input keys includes a ten-key numeric input.

5. The apparatus according to claim 1, wherein said plurality of input keys includes a cursor movement input.

6. The apparatus according to claim 1, wherein said plurality of input keys includes a plurality of function keys.

7. The apparatus according to claim 1, wherein said plurality of input keys includes a ten-key numeric input, a cursor movement input, and a plurality of function keys.

* * * * *